(12) United States Patent
Hao et al.

(10) Patent No.: US 6,937,238 B2
(45) Date of Patent: Aug. 30, 2005

(54) SYSTEM FOR VISUALIZING MASSIVE WEB TRANSACTION DATA SETS WITHOUT OVERLAPPING

(75) Inventors: Ming C. Hao, Palo Alto, CA (US); Pankaj Garg, Sunnyvale, CA (US); Umeshwar Dayal, Saratoga, CA (US); Vijay Machiraju, Mountain View, CA (US); Daniel Cotting, Zurich (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 10/392,646

(22) Filed: Mar. 20, 2003

(65) Prior Publication Data

US 2004/0183799 A1 Sep. 23, 2004

(51) Int. Cl.[7] .............................................. G06T 11/20
(52) U.S. Cl. ..................................... 345/440; 345/419

(58) Field of Search .............................. 345/440, 440.1, 345/619, 748, 762, 782, 848, 853, 854, 418, 449, 420; 707/104.1

(56) References Cited

U.S. PATENT DOCUMENTS

| | | | | |
|---|---|---|---|---|
| 6,297,824 | B1 | * 10/2001 | Hearst et al. | 345/848 |
| 6,570,582 | B1 | * 5/2003 | Sciammarella et al. | 345/660 |
| 6,742,003 | B2 | * 5/2004 | Heckerman et al. | 707/104.1 |
| 2002/0163546 | A1 | * 11/2002 | Gallo | 345/848 |

* cited by examiner

*Primary Examiner*—Matthew Luu

(57) ABSTRACT

A web transaction visualization system may include at least one web transaction visualization (WTV) processor adapted to automatically extract massive amounts of web transaction data from at least one data source for visual classification based on at least one aggregate transaction metric and to display the classified web transaction data interactively in three dimensions without overlapping.

29 Claims, 8 Drawing Sheets

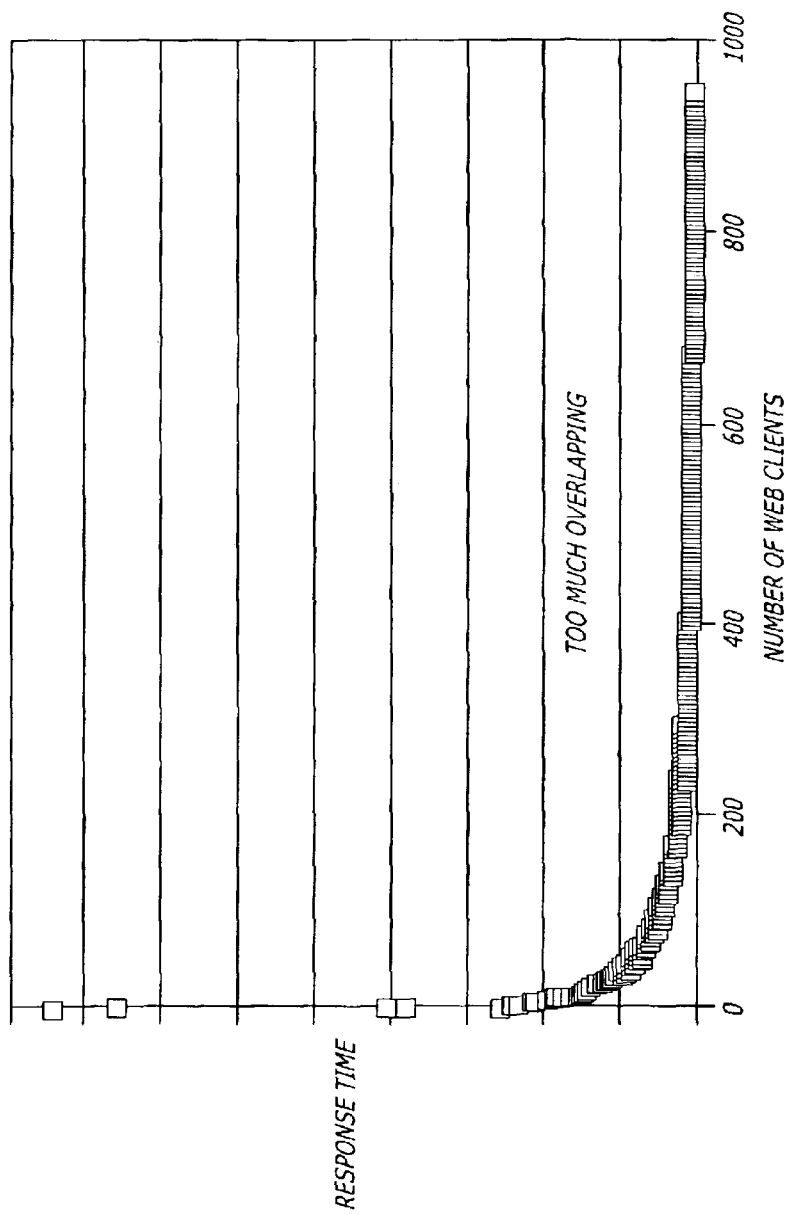

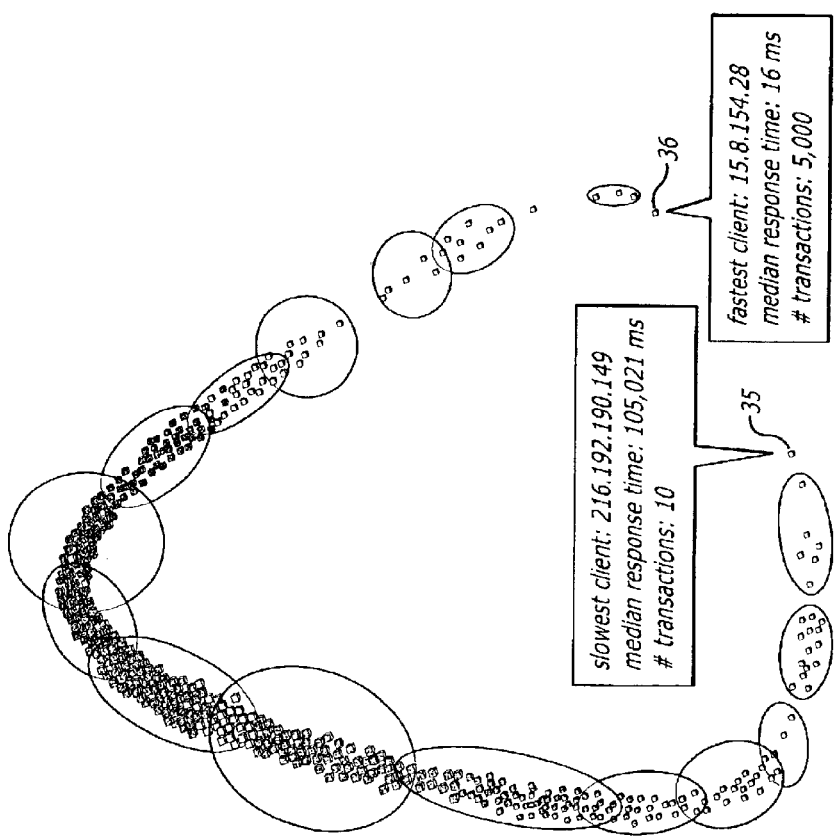

SYSTEM FOR VISUALIZING MASSIVE WEB TRANSACTION DATA SETS WITHOUT OVERLAPPING

FIELD OF THE INVENTION

The present disclosure relates generally to system analysis of web transaction data sets and more particularly to a system for visualizing massive web transaction data sets without overlapping.

BACKGROUND OF THE INVENTION

The rapid increase in electronic transactions has led to the availability of massive volumes of web transaction data. Web transaction data generally refers to transaction data residing on World Wide Web (WWW) servers. WWW generally refers to all the resources and users on the Internet (a worldwide system of computer networks) using the Hypertext Transfer Protocol (HTTP).

Business research efforts have always focused on how to turn raw web transaction data into usable information. For example, by exploring web data access behavior, business system analysts may be able to find and retain their most valuable users and evolve their best service strategies.

A web transaction typically starts with a user clicking on a web page to request a web service or information. The request is passed through one or more web servers which respond to the user accordingly with the median server response being measured in milliseconds. In order to provide faster service, web system analysts need to analyze web transaction data and try to balance the workload among their web servers to prevent network bottlenecks. When the web transaction data set is fairly large, one problem faced by system analysts is how to visually analyze and correlate the performance of millions of web transactions.

A common technique for visualizing web access is a two-dimensional scatter plot. The scatter plot technique positions pairs of web clients and server response time on separate axes to visualize their relationships. However, visualizing massive web transaction data sets using a scatter plot is too restrictive. The scatter plot is typically capable of only showing a maximum of 10–20 data items without overlapping. When the number of data items is in the thousands, the scatter plot display becomes too cluttered. In such case, the scatter plot may exhibit too much overlapping which occurs due to high-density data, as generally shown in FIG. 7. Furthermore, scatter plots do not support user interactions such as zoom in/out, drill-down, etc. Scatter plots are not scalable when fairly large volumes of web transaction data are involved. Moreover, no real-time visual filtering is possible with scatter plots, i.e. data pre-processing is always needed when analyzing massive volumes of web transaction data.

SUMMARY OF THE INVENTION

The present invention is generally directed to a web transaction visualization system comprising at least one web transaction visualization (WTV) processor adapted to automatically extract massive amounts of web transaction data from at least one data source for visual classification based on at least one aggregate transaction metric and to display the classified web transaction data interactively in three dimensions without overlapping.

These and other aspects of the present invention will become apparent from a review of the accompanying drawings and the following detailed description of the preferred embodiments of the present invention.

BRIEF DESCRIPTION OF THE DRAWINGS

The invention is generally shown by way of example in the accompanying drawings in which:

FIG. 7 is a conventional scatter plot of response time versus number of web clients for an exemplary web transaction data set showing too much overlapping; and FIG. 8 is a graphical display of a web transaction data set processed by the visualization system of FIG. 1 including exemplary automatic alarm system views in accordance with embodiments of the present invention.

DETAILED DESCRIPTION OF THE PREFERRED EMBODIMENTS

Hereinafter, some preferred embodiments of the present invention will be described in detail with reference to the related drawings of FIGS. 1–8. Additional embodiments, features and/or advantages of the invention will become apparent from the ensuing description or may be learned by practicing the invention.

The drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
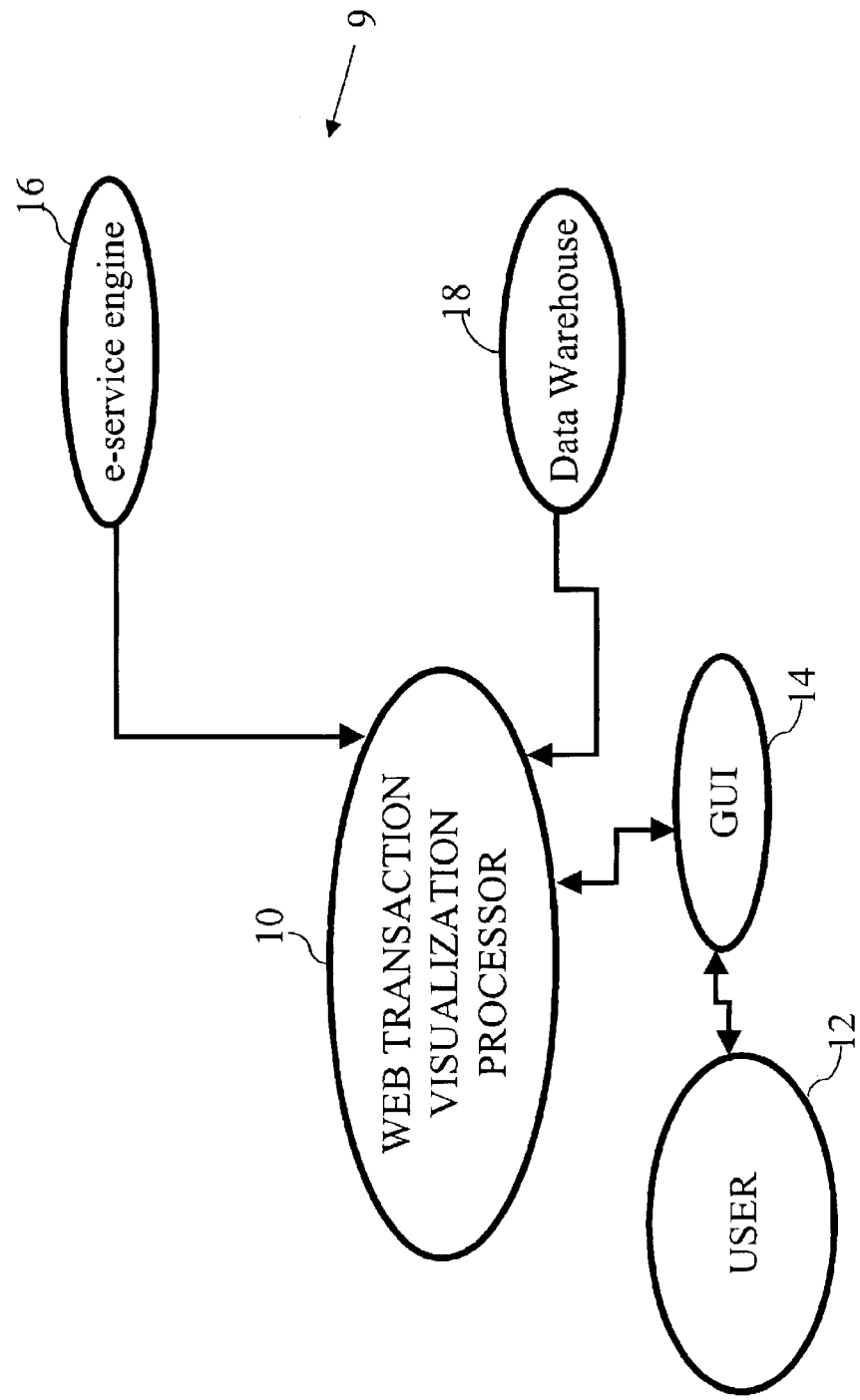
FIG. 1 is a schematic representation of a system for visualizing massive web transaction data sets without overlapping in accordance with embodiments of the present invention.
Figure 2:
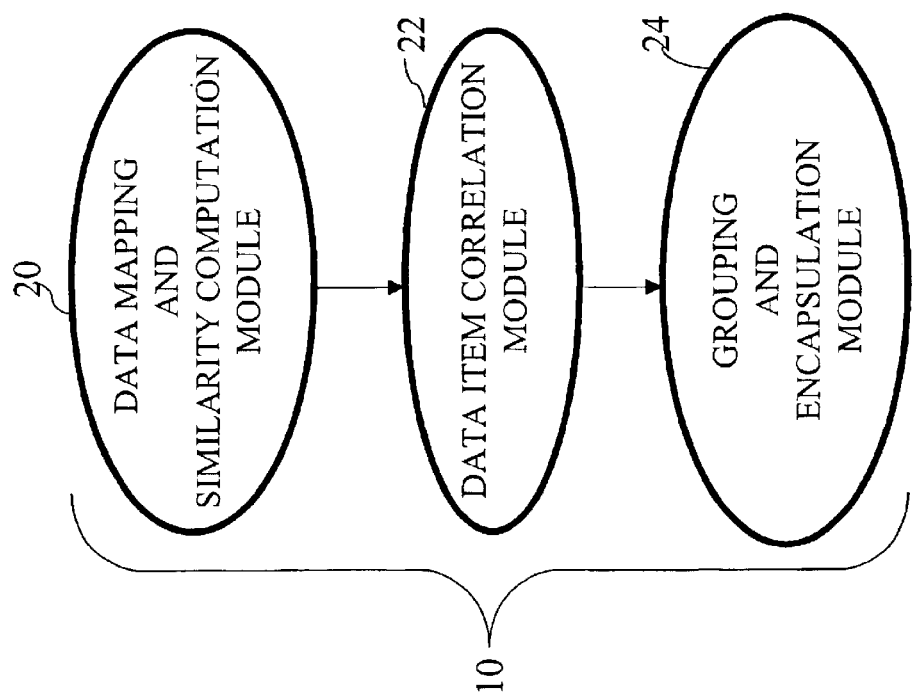
FIG. 2 is a schematic representation of the internal structure of a web transaction visualization processor of the visualization system of FIG. 1 in accordance with embodiments of the present invention.

Turning to FIG. 1, a system for visualizing massive web transaction data sets without overlapping, generally referred to by a reference numeral 9, preferably comprises a web transaction visualization (WTV) processor 10 adapted to extract web transaction data from e-service engines and/or data warehouses, such as e-service engine 16 and/or data warehouse 18, respectively, for processing, and to interact with users, such as user 12, for display of user input and/or processed web transaction data via a GUI (graphical user interface) 14. WTV processor 10 is preferably configured using Java®-based multi-threaded parallelism and adapted to process the extracted web transaction data in stages using a plurality of operatively coupled modules, such as, for example, data mapping and similarity computation module 20, data item correlation module 22, and grouping and encapsulation module 24, as generally illustrated in FIG. 2.

Data mapping and similarity computation (DMSC) module 20 is preferably programmed to map data items (e.g., URLs of web clients, web servers, etc.), extracted from web transaction data set(s) residing on e-service engine 16 and/or data warehouse 18, onto a spherical surface using standard spherical data mapping algorithms. More details on spherical data mapping algorithms may be found, for example, in Proceedings of the IEEE Information Visualization 1997, Arizona, entitled "Visualizing Information on a Sphere", by M. H. Gross, T. C. Sprenger, and J. Finger. Specifically, the mapped data items are represented as vertices on a spherical surface, as generally depicted in the 'initial placement' portion of FIG. 4. The initial positions of the mapped data items (vertices) may be disposed at random on the spherical surface. To avoid random pre-grouping of initially mapped data items, DMSC module 20 is preferably adapted to distribute mapped data items in equally spaced positions based on standard Poisson Disc Sampling (PDS) approximation algorithms. More details on PDS approximation algorithms may be found, for example, in "Principles of Digital Image Synthesis", by A. S. Glassner, published by Morgan Kaufman, San Francisco, 1995.

A web transaction data set may be in the form of a web log record containing information on the URLs (uniform resource locators) of web clients accessing a plurality of web servers, the URLs of the web servers being accessed, and the median server response time for each server. For example, $M_1$ may be designated as the median server response time for a web server W which is involved in a web transaction $T_1$ with a web client (data item) $I_1$; $M_2$ may be designated as the median server response time for web server W which is involved in a web transaction $T_2$ with a web client (data item) $I_2$; $M_3$ may be designated as the median server response time for web server W which is involved in a web transaction $T_3$ with a web client (data item) $I_3$ etc.

In accordance with a preferred embodiment of the present invention, DMSC module 20 (FIG. 2) is programmed to compute the similarity (correlation) between web clients (data items $I_i$, $I_j$) involved in web transactions with respective web servers using an aggregate transaction metric such as, for example, median server response time ($M_i$), and the following linear similarity mapping:

$$S_{ij} = \min(1.0, \mu/2|M_i - M_j|)$$

wherein $S_{ij}$ is defined as the similarity (correlation) between data items $I_i$ and $I_j$;

½ is a preferred scaling factor obtained from experimentation;

$M_i$ is the median server response time for web transaction $T_i$ involving data item $I_i$;

$M_j$ is the median server response time for web transaction $T_j$ involving data item $I_j$; and $\mu$ is the average difference in median server response time associated with data items $I_i$ and $I_j$, and web transactions $T_i$ and $T_j$, respectively.

For example, the average difference in median server response time associated with data items $I_1$, $I_2$, and $I_3$, and web transactions $T_1$, $T_2$, and $T_3$, respectively, may be defined as follows:

$$\mu = [|M_1 - M_2| + |M_1 - M_3| + |M_2 - M_3|]/3.$$

The computed similarity values may be arranged in a n×n similarity matrix $\{S_{ij}\}$, where $i = [1, \ldots, n]$, and $j = [1, \ldots, n]$. To avoid large statistical deviations, DMSC module 20 may be programmed to store only similarity values which are less than a pre-set $\delta$ value, otherwise a zero value would be returned. For example, the value of $\delta$ may be set at about 20% of the maximum median server response time ($M_{max}$) in a web transaction data set. A person skilled in the art would readily recognize that other $\delta$ values and/or other scaling factors may be utilized in connection with the above-described similarity mapping, provided such other $\delta$ values and/or scaling factors, respectively, do not depart from the intended purpose, spirit and/or scope of the present invention.

Figure 4:
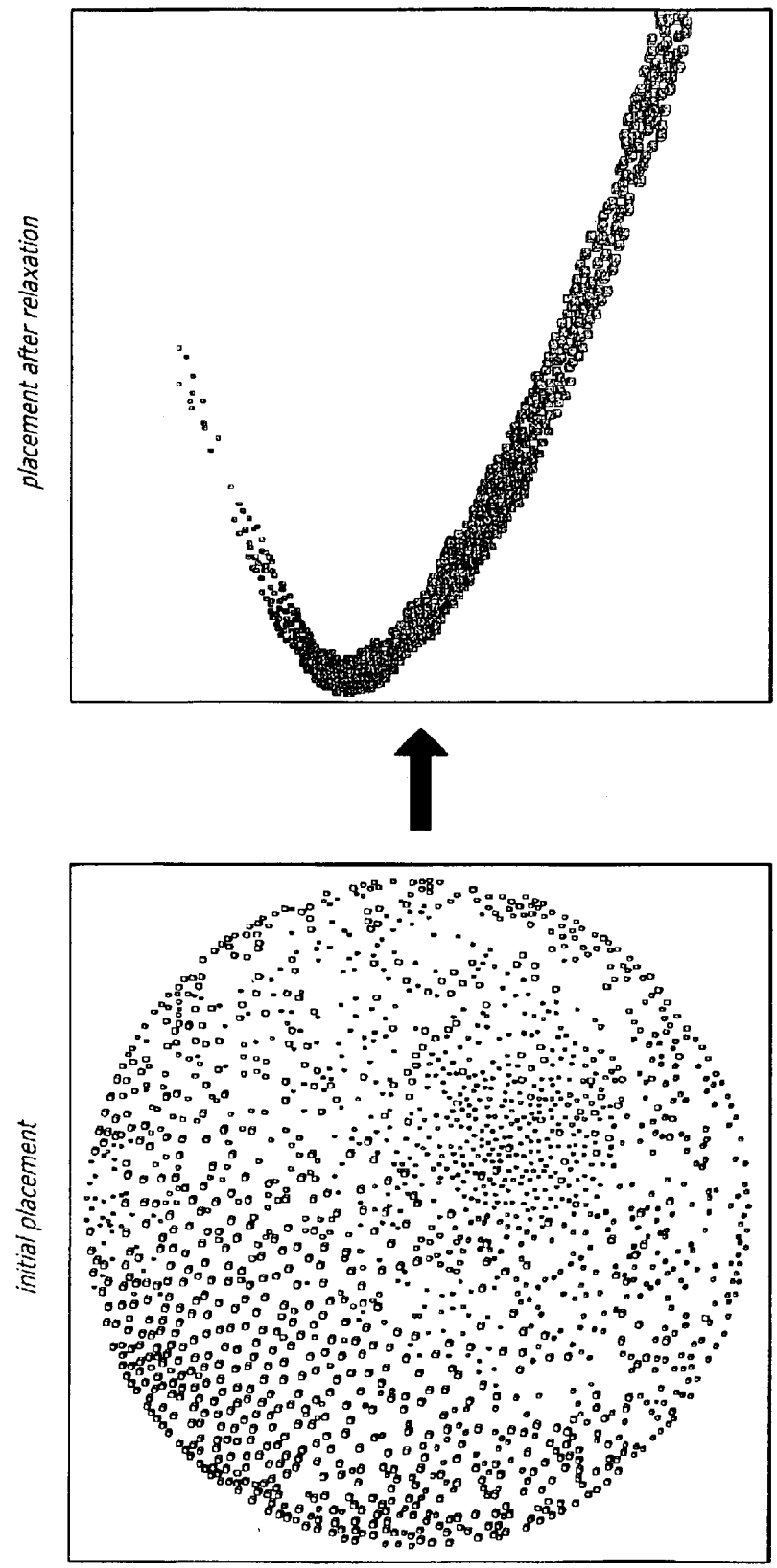
FIG. 4 is a graphical representation of a first data item processing stage in accordance with embodiments of the present invention.

In accordance with another preferred embodiment of the present invention, data item correlation (DIC) module 22 (FIG. 2) is adapted to correlate the computed similarity values for the spherically mapped data items with corresponding relative distances between data items on a three-dimensional graph (FIG. 4) in a series of computational iterations. Specifically, DIC module 22 is programmed to "connect" the spherically mapped data items with "springs" using a standard physics-based mass-spring engine whereby the stiffness of the connecting "springs" is defined by similarity matrix $\{S_{ij}\}$. The stiffness value of each connecting spring is correlated with a corresponding relative distance between two data items on a three-dimensional graph (FIG. 4). After many iterations the graph is "relaxed", i.e. reaches a local minimum which corresponds, essentially, to moving similar data items close to each other and pushing dissimilar data items away from each other, as generally illustrated in FIG. 4. More details on physics-based mass-spring engine techniques may be found, for example, in T. C. Sprenger, M. H. Gross, "Ivory—An Object Oriented Framework for Physics-Based Information Visualization in Java", IEEE InfoVis98, North Carolina.

Figure 5:
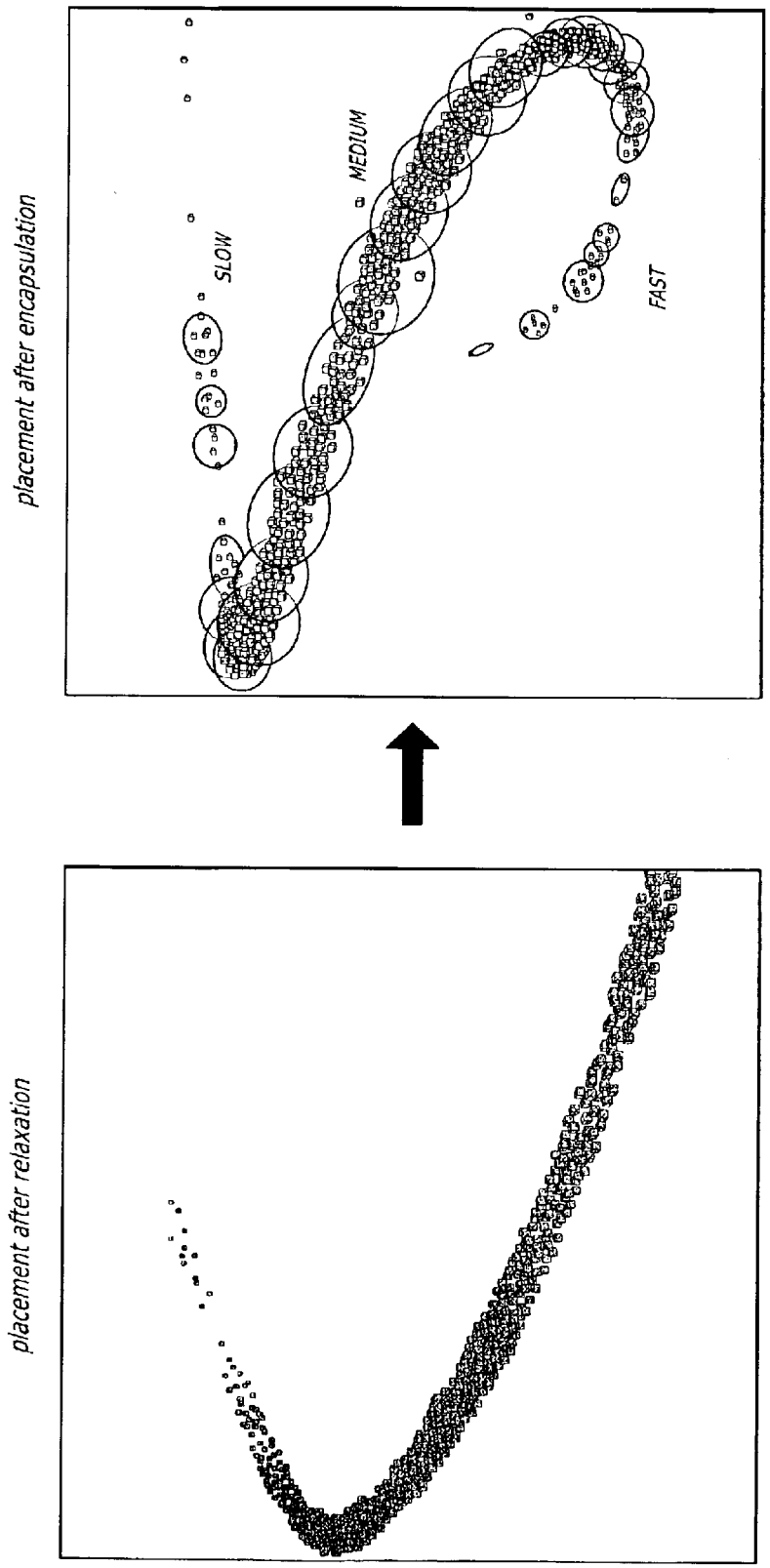
FIG. 5 is a graphical representation of a second data item processing stage in accordance with embodiments of the present invention.

In accordance with yet another preferred embodiment of the present invention, grouping and encapsulation (GE) module 24 (FIG. 2) uses K-means type algorithms to group the relaxed data item set into different categories according to similarity value such as, for example, "fast", "medium", or "slow", and encapsulate (wrap) sub-groups of highly related (similar) data items with generally transparent ellipsoidal surfaces to produce the three-dimensional grouped graph layout of FIG. 5. The number of similar data items in a sub-group (ellipsoid) and their relative positions control the shape of the ellipsoidal surface. Grouping analysis is generally based on partitioning a collection of data points into a number of sub-groups, where the objects (data points) inside a sub-group show a certain degree of closeness or similarity. The K-means algorithm assigns each data point to one and only one of the sub-groups with a degree of membership equal to one, assuming well defined boundaries between the sub-groups. When boundaries between sub-groups are not well defined, a number of known grouping algorithms based on fuzzy extension of the least-square error criterion may be utilized. More details on K-means type algorithms may be found, for example, in J. MacQueen, "Some Methods for Classification and Analysis of Multivariate Observations", The $5^{th}$ Berkeley symposium on mathematical statistics and probability, Berkeley, Calif., 1967.

Figure 6:
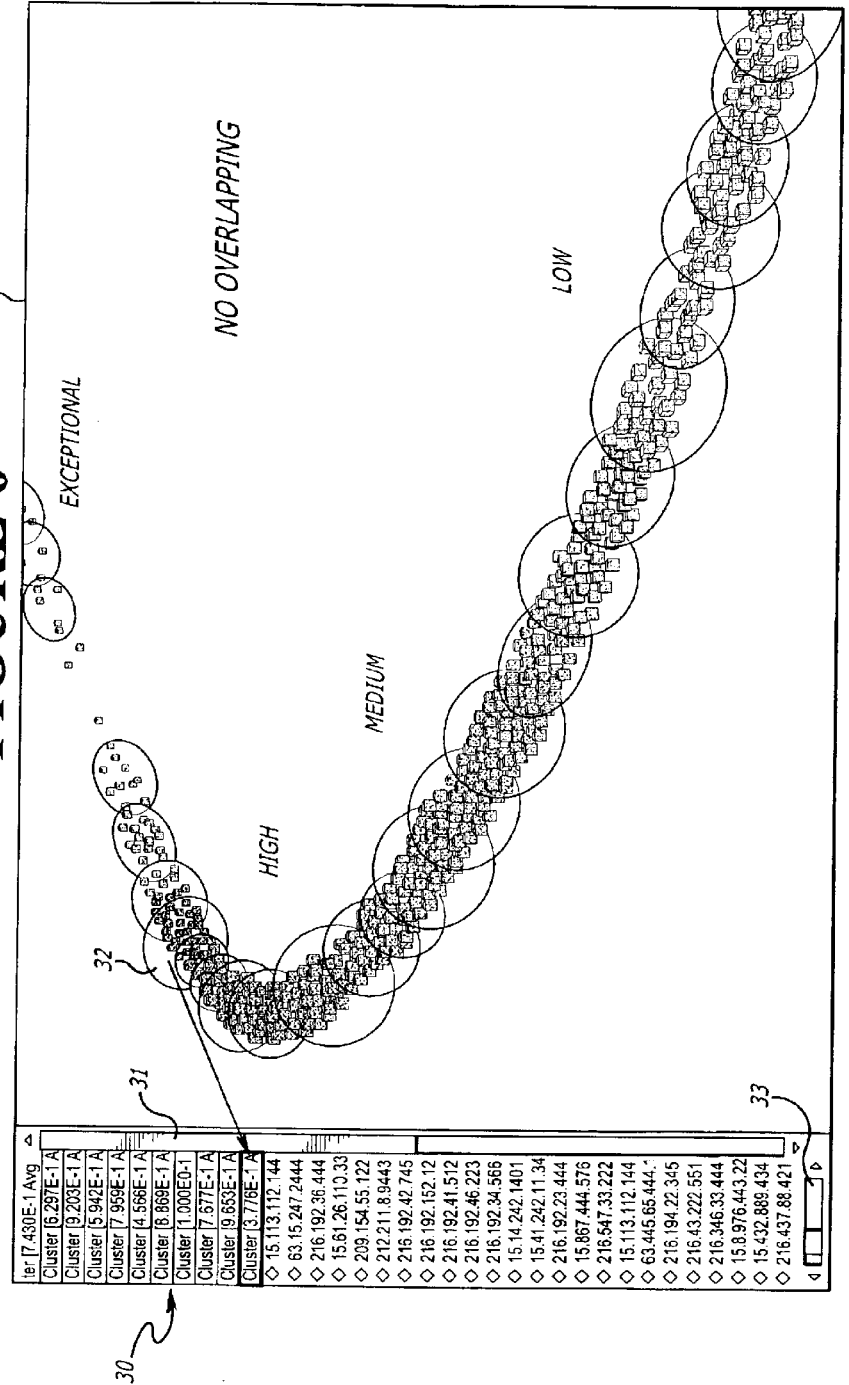
FIG. 6 is a graphical display of a web transaction data set processed by the visualization system of FIG. 1 including exemplary multiple linked views in accordance with embodiments of the present invention.

To prevent two closely spaced sub-groups (ellipsoids) from being placed on top of each other, GE module 24 is preferably programmed to utilize a sub-group positioning algorithm which continuously computes relative distances on the spherical surface between respective sub-groups and automatically pushes away neighboring sub-groups (ellipsoids) with relative spacing on that spherical surface being less than a pre-set threshold to prevent overlapping (FIGS. 5–6). A person skilled in the art would recognize that the lack of overlapping offers significant advantages to the system analyst over the use of conventional web transaction visualization methods such as, for example, two-dimensional scatter plots which are normally employed for low density (100–200 data items) data sets. As the data set becomes fairly large, the standard scatter plot quickly becomes cluttered and difficult to visualize due to the presence of too much overlapping, as generally depicted in FIG. 7.

To improve visualization, color may be used to represent the degree of similarity between data items in respective sub-groups in accordance with another embodiment of the present invention. For example, the data items (schematically shown as cube-like structures in FIGS. 5–6, and 8) in each sub-group (ellipsoid) classified under the "low" category of FIG. 6 may be colored in gradual variations of green depending on similarity. Similarly, data items in sub-groups classified under the "medium" category of FIG. 6 may be colored in gradual variations of blue, while data items in sub-groups classified under the "high" category of FIG. 6 may be colored in gradual variations of burgundy. Also, data items in sub-groups classified under the "exceptional" category of FIG. 6 may be shown, for example, in solid black, etc. Other color configurations may be used, provided there is no deviation from the intended spirit and scope of the present invention.

Figure 3:
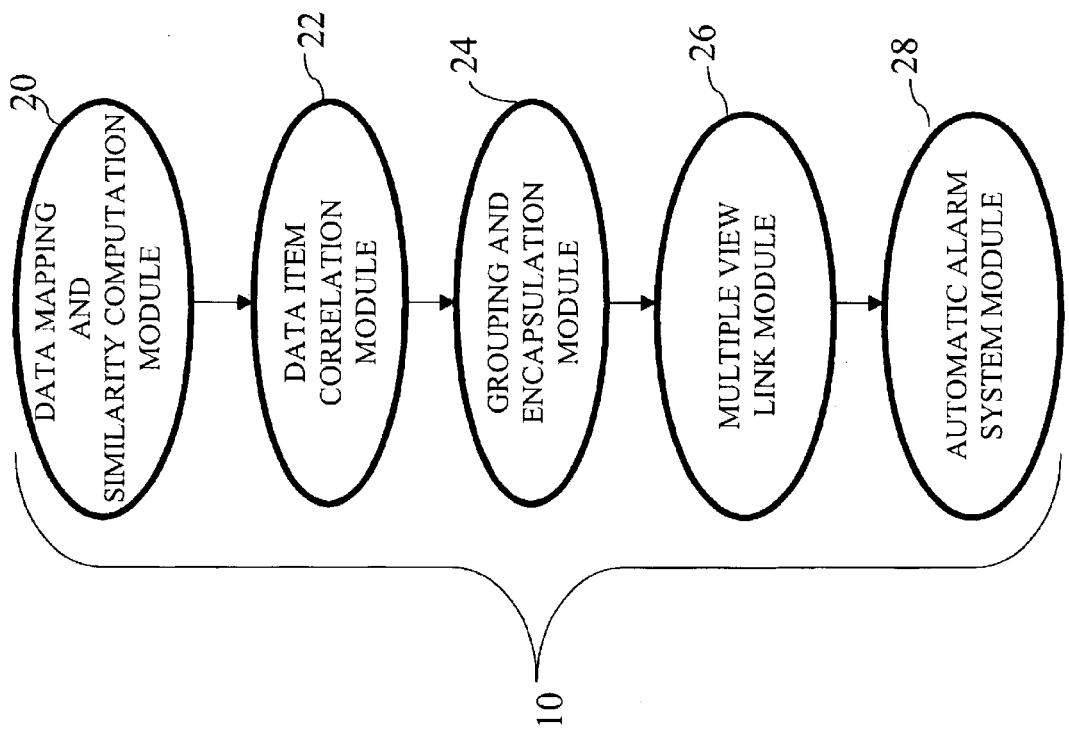
FIG. 3 is another schematic representation of the internal structure of a web transaction visualization processor of the visualization system of FIG. 1 in accordance with embodiments of the present invention.

In accordance with another embodiment of the present invention, WTV processor 10 preferably includes a multiple view link (MVL) module 26, and an automatic alarm system (AAS) module 28, as generally depicted in FIG. 3.

MVL module 26 is programmed to provide the three dimensional grouped graph layout with multiple linked views for interactive visual data analysis. In many instances, the web transaction data that needs to be visually analyzed consists of multiple relationships. With multiple linked views one can easily visualize correlations among the various data items. Whenever multiples views are presented, items across all the views are linked. For example, the data items in sub-group (ellipsoid) 32 (FIG. 6) are linked to a tree table 30 (FIG. 6) positioned at the left side of the graph allowing the user to easily look up web transaction information on each sub-group of data items, such as the average response time for sub-group 32 as well as the median response time for each client (data item) in that sub-group. As generally shown in FIG. 6, the table tree view may include vertical and/or horizontal selection sliders, such as selection sliders 31 and 33, respectively when the number of items exceeds what can be viewed on a single screen. The user can select one or more sub-group(s) and zoom in/out on the data items in each selected sub-group for system analysis, as needed.

A person skilled in the art should also recognize that the interactive three-dimensional graphical data item visualization display of the present invention, as generally shown in FIG. 6, is a significant improvement over traditional non-interactive two-dimensional scatter plot visualization layouts. For example, the user cannot select, or zoom in/out on any portion of the data displayed on the scatter plot of FIG. 7.

AAS module 28 is programmed to automatically notify the user in a generally conspicuous visual manner whenever exceptional data items or sub-group(s) of data items are detected. Exceptional data items may refer to web clients associated with very short or unusually long median server response time(s). The visual notification may be in the form of a flashing or highlighted sub-group (ellipsoid) of data items, or data item, or the exceptional data items or sub-group(s) of data items may be circled in a contrasting color. For example, data item 35 (FIG. 8) is shown as being the slowest client of the web transaction data set of FIG. 8 with a distinctive pop-up description dialog box 35*a* presenting pertinent information such as URL, median response time, and number of web transactions optionally displayed proximate thereto. Similarly, data item 36 (FIG. 8) is shown as being the fastest client of the web transaction data set of FIG. 8 with associated dialog box 36*a* displaying pertinent information such as URL, median response time, and number of web transactions displayed proximate thereto. Other ways of notifying the user of exceptional events may be used, such as by audible means, provided there is no deviation from the intended purpose of the present invention.

Certain embodiments of the present invention may be made, sold, and or used in the form of a computer usable medium (such as a hard drive, compact disk (CD) and/or other suitable recording medium) which includes computer readable program code tangibly embodied therein for controlling the above-described process of visualizing massive web transaction data sets without overlapping, as generally illustrated in FIGS. 1–6, 8.

Such an embodied computer readable program code may include program modules or software routines for mapping data items extracted from at least one data source onto a spherical surface and computing the similarity values between the spherically mapped data items based on at least one aggregate transaction metric such as, for example, median server response time (M), for correlating the computed similarity values for the spherically mapped data items with corresponding relative distances between data items on a three-dimensional graph in a series of computational iterations until the data item set is relaxed, and for grouping the relaxed data item set into categories according to similarity value and encapsulating sub-groups of substantially related data items for web transaction visualization on the three-dimensional graph. Moreover, the embodied program code may also include routines for continuously computing relative distances between the sub-groups and pushing away neighboring sub-groups with relative spacing being less than a pre-set threshold value to eliminate overlapping, for providing the three-dimensional graph with multiple linked views for interactive visual data analysis, and for detecting exceptional data items and/or exceptional sub-groups of data items and providing corresponding notification to the user, as generally shown in FIG. 3, 6, and 8.

A person skilled in the art would undoubtedly appreciate that the above-described novel interactive web transaction visualization system may be used with massive web transaction data set(s) with the overlapping problem of prior setups being eliminated in its entirety. In accordance with one exemplary embodiment of the present invention, the interactive web transaction visualization system of the present invention has been used to classify a data set containing over 35,000 web transactions with thousands of web clients and URLs. The novel web transaction visualization system also provides fast and interactive means for easily navigating through large volumes of web transactions for the purpose of locating network bottlenecks and/or to enhance overall network performance. Furthermore, the interactive web transaction visualization system of the present invention greatly enhances the quality of end-user experience and may be easily scaled up for massive web transaction data sets. Also, the novel web transaction visualization system may be easily adapted to allow real-time visual filtering thereby eliminating the need for data pre-processing as customarily practiced in the prior art.

Other components and/or configurations may be utilized in the above-described embodiments, provided such other components and/or configurations do not depart from the intended purpose and scope of the present invention. While the present invention has been described in detail with regards to one or more preferred embodiments, it should also be appreciated that various modifications and variations may be made in the present invention without departing from the scope or spirit of the invention. In this regard it is important to note that practicing the invention is not limited to the applications described hereinabove. Other applications and/or alterations may become apparent to those skilled in the art.

It should be appreciated by a person skilled in the art that features illustrated or described as part of one embodiment may also be used in other embodiments. It is, therefore, intended that the present invention cover all such modifications, embodiments and variations as long as such modifications, embodiments and variations remain within the scope of the appended claims and their equivalents.

What is claimed is:

1. A web transaction visualization system comprising at least one web transaction visualization (WTV) processor adapted to automatically extract massive amounts of web transaction data from at least one data source for visual classification based on at least one aggregate transaction metric and to display the classified web transaction data interactively in three dimensions without overlapping, wherein said at least one WTV processor comprises:
   (a) a first module adapted to map data items extracted from said at least one data source onto a spherical surface and compute the similarity values between said spherically mapped data items based on said at least one aggregate transaction metric, said spherically mapped data items forming a data item set;
   (b) a second module adapted to correlate the computed similarity values for said spherically mapped data items with corresponding relative distances between data items on a three-dimensional graph in a series of computational iterations until said data item set is relaxed; and
   (c) a third module adapted to group said relaxed data item set into categories according to similarity value and encapsulate sub-groups of substantially related data items for web transaction visualization on said three-dimensional graph.

2. The web transaction visualization system of claim 1, wherein said second module uses a physics-based mass-spring engine to correlate the computed similarity values for said spherically mapped data items with corresponding relative distances between data items on said three-dimensional graph.

3. The web transaction visualization system of claim 1, wherein said first module is further adapted to distribute said spherically mapped data items in equally spaced positions to avoid random pre-grouping of said spherically mapped data items.

4. The web transaction visualization system of claim 1, wherein said third module is further adapted to continuously compute relative distances between said sub-groups and automatically push away neighboring sub-groups with relative spacing being less than a threshold value to eliminate overlapping.

5. The web transaction visualization system of claim 1, wherein said at least one aggregate transaction metric is median server response time (M).

6. The web transaction visualization system of claim 5, wherein the similarity ($S_{ij}$) between data items $I_i$ and $I_j$ from said data item set is proportional to min (1.0, $\mu/2|M_i-M_j|$), where $M_i$ is defined as the median server response time for a web transaction involving data item $I_i$, $M_j$ is defined as the median server response time for a web transaction involving data item $I_j$, and $\mu$ is defined as the average difference in median server response time associated with data items $I_i$ and $I_j$.

7. The web transaction visualization system of claim 6, wherein the average difference in median server response time ($\mu$) associated with data items $I_1$, $I_2$, and $I_3$ from said data item set is defined as $[|M_1-M_2|+|M_1-M_3|+|M_2-M_3|]/3$.

8. The web transaction visualization system of claim 7, wherein said first module is adapted to store only $S_{ij}$ values being less than a pre-set $\delta$ value.

9. The web transaction visualization system of claim 8, wherein said $\delta$ value is set at about 20% of the maximum median server response time ($M_{max}$) in said data item set.

10. The web transaction visualization system of claim 8, wherein said stored $S_{ij}$ values are arranged in a n×n similarity matrix $\{S_{ij}\}$, where i=[1, . . . , n], and j=[1, . . . , n].

11. The web transaction visualization system of claim 1, wherein said third module uses K-means type algorithms to group said relaxed data item set into categories according to similarity value and encapsulate said sub-groups of substantially related data items with substantially ellipsoidal surfaces.

12. The web transaction visualization system of claim 11, wherein said substantially ellipsoidal surfaces are substantially transparent for easy visualization.

13. The web transaction visualization system of claim 12, wherein said third module is adapted to use color to visually represent the degree of similarity between data items in respective ellipsoidally encapsulated sub-groups.

14. The web transaction visualization system of claim 1, further comprising a fourth module adapted to provide said three-dimensional graph with multiple linked views for interactive visual data analysis.

15. The web transaction visualization system of claim 15, wherein said multiple linked views include at least one tree table view.

16. The web transaction visualization system of claim 1, further comprising a fifth module adapted to adapted to detect exceptional data items and provide corresponding visual notification on said three-dimensional graph.

17. The web transaction visualization system of claim 16, wherein said fifth module is further adapted to detect exceptional sub-groups of data items and provide corresponding visual notification on said three-dimensional graph.

18. The web transaction visualization system of claim 1, further comprising a fifth module adapted to detect exceptional data items and provide corresponding notification to the user.

19. The web transaction visualization system of claim 18, wherein said fifth module is further adapted to detect exceptional sub-groups of data items and provide corresponding notification to the user.

20. The web transaction visualization system of claim 3, wherein said first module uses Poisson Disc Sampling (PDS) approximation algorithms to distribute said spherically mapped data items in equally spaced positions.

21. A web transaction visualization system comprising at least one web transaction visualization (WTV) processor adapted to extract massive amounts of web transaction data from at least one data source for visual classification based on at least one aggregate transaction metric and display interactively the classified web transaction data without overlapping, said at least one WTV processor comprising:

(a) a first module adapted to map data items extracted from said at least one data source onto a spherical surface and compute the similarity values between said spherically mapped data items based on said at least one aggregate transaction metric, said spherically mapped data items forming a data item set;

(b) a second module adapted to correlate the computed similarity values for said spherically mapped data items with corresponding relative distances between data items on a three-dimensional graph in a series of computational iterations until said data item set is relaxed;

(c) a third module adapted to group said relaxed data item set into categories according to similarity value and encapsulate sub-groups of substantially related data items for web transaction visualization on said three-dimensional graph;

(d) a fourth module adapted to provide said three-dimensional graph with multiple linked views for interactive visual data analysis; and (e) a fifth module adapted to detect exceptional data items and provide corresponding notification to the user.

22. A web transaction visualization system comprising at least one web transaction visualization (WTV) processor adapted to extract massive amounts of web transaction data from at least one data source for visual classification based on at least one aggregate transaction metric and display interactively the classified web transaction data without overlapping, said at least one WTV processor comprising:

(a) a first module adapted to map data items extracted from said at least one data source onto a spherical surface and compute the similarity values between said spherically mapped data items based on said at least one aggregate transaction metric, said spherically mapped data items forming a data item set;

(b) a second module adapted to correlate the computed similarity values for said spherically mapped data items with corresponding relative distances between data items on a three-dimensional graph in a series of computational iterations until said data item set is relaxed;

(c) a third module adapted to group said relaxed data item set into categories according to similarity value and encapsulate sub-groups of substantially related data items for web transaction visualization on said three-dimensional graph;

(d) a fourth module adapted to provide said three-dimensional graph with multiple linked views for interactive visual data analysis; and (e) a fifth module adapted to detect exceptional sub-groups of data items and provide corresponding notification to the user.

23. A web transaction visualization system comprising at least one web transaction visualization (WTV) processor adapted to extract massive amounts of web transaction data from at least one data source for visual classification based on at least one aggregate transaction metric and display interactively the classified web transaction data without overlapping, said at least one WTV processor comprising:

(a) a first module adapted to map data items extracted from said at least one data source onto a spherical surface and compute the similarity between said spherically mapped data items based on said at least one aggregate transaction metric, said spherically mapped data items forming a data item set, said at least one aggregate transaction metric being median server response time (M), the similarity ($S_{ij}$) between data items $I_i$ and $I_j$ from said data item set being proportional to min $(1.0, \mu/2|M_i-M_j|)$, where $M_i$ is defined as the median server response time for a web transaction involving data item $I_i$, $M_j$ is defined as the median server response time for a web transaction involving data item $I_j$, and $\mu$ is defined as the average difference in median server response time associated with data items $I_i$ and $I_j$, the average difference in median server response time ($\mu$) associated with data items $I_1$, $I_2$, and $I_3$ from said data item set being defined as $[|M_1-M_2|+|M_1-M_3|+|M_2-M_3|]/3$;

(b) a second module adapted to correlate the computed similarity values for said spherically mapped data items with corresponding relative distances between data items on a three-dimensional graph in a series of computational iterations until said data item set is relaxed;

(c) a third module adapted to group said relaxed data item set into categories according to similarity value and encapsulate sub-groups of substantially related data items for web transaction visualization on said three-dimensional graph;

(d) a fourth module adapted to provide said three-dimensional graph with multiple linked views for interactive visual data analysis; and (e) a fifth module adapted to detect exceptional data items and provide corresponding notification to the user.

24. A web transaction visualization system comprising at least one web transaction visualization (WTV) processor adapted to extract massive amounts of web transaction data from at least one data source for visual classification based on at least one aggregate transaction metric and display interactively the classified web transaction data without overlapping, said at least one WTV processor comprising:

(a) a first module adapted to map data items extracted from said at least one data source onto a spherical surface and compute the similarity between said spherically mapped data items based on said at least one aggregate transaction metric, said spherically mapped data items forming a data item set, said at least one aggregate transaction metric being median server response time (M), the similarity ($S_{ij}$) between data items $I_i$ and $I_j$ from said data item set being proportional to min $(1.0, \mu/2|M_i-M_j|)$, where $M_i$ is defined as the median server response time for a web transaction involving data item $I_i$, $M_j$ is defined as the median server response time for a web transaction involving data item $I_j$, and $\mu$ is defined as the average difference in median server response time associated with data items $I_i$ and $I_j$, the average difference in median server response time ($\mu$) associated with data items $I_1$, $I_2$, and $I_3$ from said data item set being defined as $[|M_1-M_2|+|M_1-M_3|+|M_2-M_3|]/3$;

(b) a second module adapted to correlate the computed similarity values for said spherically mapped data items with corresponding relative distances between data items on a three-dimensional graph in a series of computational iterations until said data item set is relaxed;

(c) a third module adapted to group said relaxed data item set into categories according to similarity value and encapsulate sub-groups of substantially related data items for web transaction visualization on said three-dimensional graph;

(d) a fourth module adapted to provide said three-dimensional graph with multiple linked views for interactive visual data analysis; and (e) a fifth module adapted to detect exceptional sub-groups of data items and provide corresponding notification to the user.

25. A computer usable medium including computer readable program code embodied therein for visualizing massive web transaction data sets without overlapping, said computer readable program code comprising:

(a) a first module for mapping data items extracted from at least one data source onto a spherical surface and computing the similarity values between said spherically mapped data items based on at least one aggregate transaction metric, said spherically mapped data items forming a data item set;

(b) a second module for correlating the computed similarity values for said spherically mapped data items with corresponding relative distances between data items on a three-dimensional graph in a series of computational iterations until said data item set is relaxed; and (c) a third module for grouping said relaxed data item set into categories according to similarity value and encapsulating sub-groups of substantially related data items for web transaction visualization on said three-dimensional graph.

26. The computer usable medium of claim 25, wherein said second module implements a physics-based mass-spring engine for correlating the computed similarity values for said spherically mapped data items with corresponding relative distances between data items on said three-dimensional graph.

27. The computer usable medium of claim 25, wherein said third module includes a program routine for continuously computing relative distances between said sub-groups and pushing away neighboring sub-groups with relative spacing being less than a threshold value to eliminate overlapping.

28. A computer usable medium including computer readable program code embodied therein for visualizing massive web transaction data sets without overlapping, said computer readable program code comprising:

(a) a first module for mapping data items extracted from at least one data source onto a spherical surface and computing the similarity values between said spherically mapped data items based on at least one aggregate transaction metric, said spherically mapped data items forming a data item set;

(b) a second module for correlating the computed similarity values for said spherically mapped data items with corresponding relative distances between data items on a three-dimensional graph in a series of computational iterations until said data item set is relaxed;

(c) a third module for grouping said relaxed data item set into categories according to similarity value and encapsulating sub-groups of substantially related data items for web transaction visualization on said three-dimensional graph;

(d) a fourth module for providing said three-dimensional graph with multiple linked views for interactive visual data analysis; and (e) a fifth module for detecting at least one exceptional item and providing corresponding notification to the user.

29. The computer usable medium of claim 28 wherein each said exceptional item is a sub-group of data items.

* * * * *

UNITED STATES PATENT AND TRADEMARK OFFICE
CERTIFICATE OF CORRECTION

PATENT NO. : 6,937,238 B2  Page 1 of 1
APPLICATION NO. : 10/392646
DATED : August 30, 2005
INVENTOR(S) : Ming C. Hao et al.

It is certified that error appears in the above-identified patent and that said Letters Patent is hereby corrected as shown below:

In column 3, line 34, delete "$I_i$;" and insert -- $I_1$; --, therefor.

In column 8, line 8, in Claim 6, delete "$I_I$," and insert -- $I_i$, --, therefor.

In column 8, line 47, in Claim 16, after "module" delete "adapted to".

In column 10, line 11, in Claim 23, delete "$I_I$," and insert -- $I_i$, --, therefor.

Signed and Sealed this

Twenty-seventh Day of April, 2010

David J. Kappos
*Director of the United States Patent and Trademark Office*